US008781454B2

(12) United States Patent
Li et al.

(10) Patent No.: US 8,781,454 B2
(45) Date of Patent: Jul. 15, 2014

(54) METHODS AND APPARATUS FOR AUTOMATED COMMUNICATIONS FORWARDING

(75) Inventors: Li Li, Cupertino, CA (US); Ben Juang, Milpitas, CA (US); Arun Mathias, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/529,812

(22) Filed: Jun. 21, 2012

(65) Prior Publication Data

US 2013/0344855 A1 Dec. 26, 2013

(51) Int. Cl.
*H04M 3/42* (2006.01)
*H04W 4/00* (2009.01)
*H04B 1/38* (2006.01)

(52) U.S. Cl.
USPC .......................... 455/417; 455/435.2; 455/558

(58) Field of Classification Search
USPC ........................ 455/417, 435.2, 558
See application file for complete search history.

(56) References Cited

U.S. PATENT DOCUMENTS

| 6,405,030 | B1 * | 6/2002 | Suprunov ....................... 455/410 |
| 8,180,400 | B2 * | 5/2012 | Shin et al. ....................... 455/558 |
| 2008/0096517 | A1 * | 4/2008 | Appleyard et al. ........... 455/403 |
| 2010/0284317 | A1 * | 11/2010 | Chan et al. ..................... 370/311 |
| 2012/0108206 | A1 | 5/2012 | Haggerty |
| 2012/0260090 | A1 | 10/2012 | Hauck et al. |
| 2012/0275442 | A1 * | 11/2012 | Malets et al. ................. 370/338 |

FOREIGN PATENT DOCUMENTS

GB 2431072 * 10/2005

* cited by examiner

*Primary Examiner* — Olumide T Ajibade Akonai
*Assistant Examiner* — Natasha Cosme
(74) *Attorney, Agent, or Firm* — Womble Carlyle Sandridge & Rice LLP

(57) ABSTRACT

Methods and apparatus for the automated updating of forwarding preferences for communications in a telecommunications network. In one embodiment, the network includes a wireless (e.g., cellular) network with user mobile user devices configured to detect a change to their configuration (such as a user changing out SIM cards or virtual access clients). In response, the device causes an update to its associated communication forwarding preferences to reflect the change. If the configuration alteration meets certain criteria (e.g., changes the phone number at which the device may be reached), the device sends a forwarding message instructing a network entity (e.g., routing server) to direct communications addressed to the old phone number to the new phone number. Thus, a user with two or more user profiles (such as two different carrier accounts) may be reached at any number associated with any of the profiles, even if only one profile is currently active.

17 Claims, 5 Drawing Sheets

US 8,781,454 B2

METHODS AND APPARATUS FOR AUTOMATED COMMUNICATIONS FORWARDING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of telecommunications. More particularly, in one exemplary aspect, the present invention is directed to methods and apparatus for implementing automated forwarding of communications across multiple profiles over one or more telecommunications networks.

2. Description of Related Technology

Call forwarding is a system in which calls directed to one number are instead directed to a second. This allows users of call forwarding to maintain multiple phone numbers all of which may be answered at a single number. Thus, it becomes simple to manage multiple numbers with a single device or subscriber line.

Instead of maintaining a local switchboard to ensure that all calls to any of the forwarded numbers are properly directed, the switching is handled by the existing infrastructure of the telecommunications provider. Thus, a user that does not wish to maintain in-house (or on device) switching capabilities may still take advantage of the benefits of call forwarding. Forwarding may be applied in virtually all telephone and messaging technologies including mobile systems.

In the related field of mobile telecommunications, current mobile technologies make use of subscriber identity modules (SIMs) to store profiles and other configuration information. These SIMs are typically embodied in a card-like form factor, and allow users to reconfigure phones quickly. Insertion of different SIM cards even allows a user to switch among different mobile carriers. Often, all that is required to switch carriers is that the user power off the device, replace the SIM card, and power on the device. A single mobile device may behave entirely differently depending on the SIM card that is active in the device. Using different SIM cards a device may connect to different mobile carriers, and answer to calls to different phone numbers. Thus, as user maintaining multiple SIM cards may answer calls from multiple numbers on a single device by changing the active SIM card in the mobile device.

In some cases, a caller may be trying to contact a mobile user, but the number the caller is contacting may not currently be active. For example, the mobile user may have a SIM card associated with a second number active in his mobile device, while the SIM card associated with the number that the caller is attempting to contact is removed or inactive. In this case (and others), the caller's communication (e.g. voice call, SMS, MMS, etc.) is not directed through to the mobile user. A user may switch between two or more active numbers regularly, but may also wish to have some or all communications directed to any of the multiple numbers associated with the respective different SIM cards forwarded to the (then) active number.

Currently, upon switching SIM a user must manually setup call forwarding, inform their contacts that their active number has changed, or rely on the foreknowledge of their contacts to predict when such changes will happen. This is impractical given that a user may maintain large groups of likely contacts and may switch SIM cards multiple times in a given day. Thus, there is a salient need for methods and systems for automated identification of such number switching events to enable reliable and automatic forwarding of communications to an active number.

SUMMARY OF THE INVENTION

The present invention addresses the foregoing needs by disclosing, inter alia, apparatus and methods for automated communications forwarding within telecommunications networks.

In a first aspect of the present invention, a mobile device for use in one or more telecommunications networks is disclosed. In one embodiment, the mobile device includes: (i) a storage entity configured to store a network profile associated with the device; (ii) a wireless interface, and (iii) a processing entity in data communication with the storage entity and the wireless interface. The processing entity includes a plurality of instructions configured to, when executed: (i) detect a change in an operational status of the mobile device; and (ii) in response to the detection, send a message to a forwarding server, the message configured to cause the forwarding server to forward communications addressed to a first number to a second number associated with the network profile.

In a second aspect of the present invention, a method of managing communications forwarding in a telecommunications network is disclosed. In one embodiment, the method includes: (i) receiving an indication of a network configuration change for a wireless device, the network configuration change including changing a phone number of the wireless device from a first number to a second number, and (ii) based at least in part on the indication, transmitting forwarding instructions to a server entity of the network, the instructions causing one or more communications directed to the first number to be redirected to the second number.

In a third aspect of the present invention, a network server apparatus for use in direction of communications signals among a plurality of mobile devices is disclosed. In one embodiment, the network server apparatus includes: (i) a network interface configured to receive at least indications of status changes from the plurality of mobile devices, (ii) a storage device configured to store a plurality of user preferences, and (iii) a processing device configured to run at least one computer program thereon. The at least one computer program includes a plurality of instructions configured to, when executed: (i) determine if one or more of the indications of status change include a request to change an active phone number associated with one individual one of the plurality of mobile devices, and (ii) in response to the determination, cause communication signals to be forwarded to the active number associated with the one individual one of the plurality of mobile devices.

In a fourth aspect of the invention, a system for managing communications forwarding in a telecommunications network is disclosed. In one embodiment, the system includes: (i) a plurality of user devices, (ii) a network server, and (iii) a forwarding server. The plurality of user devices each include a network interface configured to: (i) send indications of configurations changes, the indications including the alteration of respective network profiles associated with respective individual ones of the plurality of user devices, and (ii) transmit updated forwarding preferences to the network server. The network server includes a (i) network interface configured to: (a) receive the indications of configurations changes, (b) receive the updated forwarding preferences, and (iii) transmit forwarding instructions to the forwarding server, (ii) a storage entity configured to store the updated forwarding preferences, and (iii) a processor configured to run a computer program. The computer program includes a plurality of instructions configured to, when executed: based on at least the updated preferences and the indications of configuration changes, determine the content of the forwarding instructions. The forwarding server includes a (i) network interface configured to receive the forwarding instructions, and (ii) a routing device to forward communications based at least in part on the forwarding instructions.

In a fifth aspect of the invention, a non-transitory computer readable medium is disclosed. In one embodiment, the computer readable medium is configured to store a computer program. The computer program includes a plurality of instructions configured to, when executed: (i) determine if a network profile change associated with a user device has occurred, the network profile change including (a) activation of a first number and (b) deactivation of a second number, and (ii) based at least in part on the determination, cause the transmission of a forwarding request to a forwarding server, the request including instructions to forward communications addressed to the second number to the first number.

Other features and advantages of the present invention will immediately be recognized by persons of ordinary skill in the art with reference to the attached drawings and detailed description of exemplary embodiments as given below.

Figure 1A:
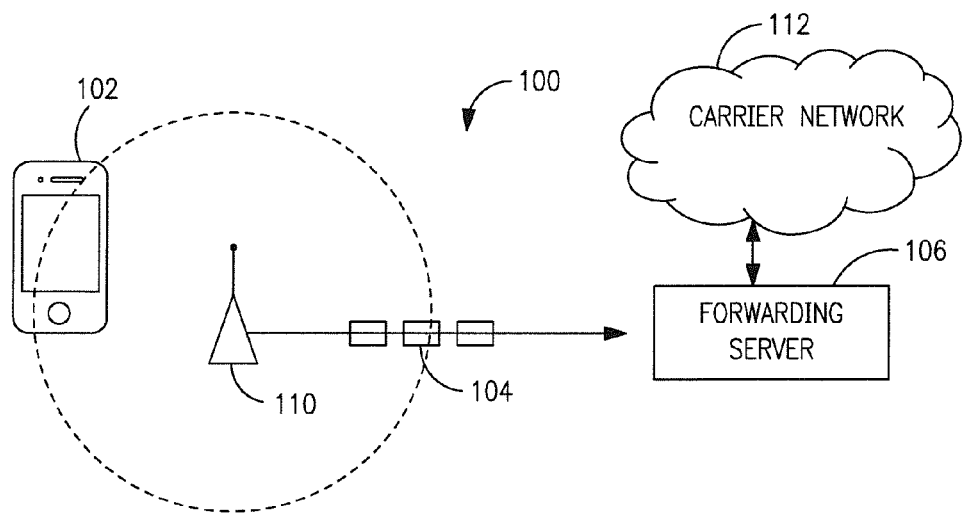
FIG. 1a is functional block diagram of one exemplary embodiment of a network architecture consistent with the present invention.

All Figures © Copyright 2012 Apple, Inc. All rights reserved.

DETAILED DESCRIPTION OF THE INVENTION

Reference is now made to the drawings, wherein like numerals refer to like parts throughout.

Overview

As indicated above, there is a need for methods and apparatus for automated forwarding of communications directed to various numbers associated with a wireless mobile device user to an active number.

Accordingly, one aspect of the present invention, mechanisms for such automated forwarding are provided. In one embodiment, a mobile device detects a request to change configuration profiles. In response, the device updates its associated forwarding preferences to reflect the change. In one implementation, the request for a configuration profile change includes replacing a SIM card in the phone with a new SIM card, or alternatively a new electronic access client (e.g., eSIM) with another. If this action changes the phone number at which the mobile device may be reached, the mobile device sends a forwarding message instructing a routing server to direct communications addressed to the old phone number to the new phone number. Thus, a user with two or more profiles may be reached at any number associated with any of the profiles, even if only one profile is currently active.

In some embodiments, the forwarding message is transmitted along with other network protocol messages using extant infrastructure and resources. Thus, the call forwarding functionality is integrated into the base functions of the network. In one variant, a baseband processor of the mobile device detects that the mobile device is about to undergo a profile change (e.g. SIM card removed and replaced during operation). The baseband processor sends a forwarding request to its previous network to forward all calls to the device's previous phone to the new network and new phone number indicated by the impending profile change. The baseband then switches active profiles. Phone calls to the previous number are now forwarded to the new number. In other embodiments, the messages are handled at higher layers. In one variant, the message is sent by a program running at the application layer of the phone. If the program detects a change in the network profile of the phone, the program sends an update message to a forwarding server. The message may be sent for example via an Internet protocol (IP) transport modality, or via another communication system (e.g. SMS, etc.).

In another aspect of the invention, the forwarding update is performed by a network server. In one implementation of the forwarding update, a network server or other entity detects the activation of a profile that it manages or monitors. In response to that detection, the server sends out messages to other servers associated with a prescribed group of other profiles. These messages instruct the other servers to forward communications directed to the profiles in the group to the newly activated profile. The group of profiles is contained in one variant in a set of preferences stored on the network server and input by the user. Similar sets of preferences are stored on the servers associated with the other profiles in the group, which may be associated with a common or different service provider(s). Thus, when any one profile is activated, the forwarding preferences of the other profiles are updated.

Detailed Description of Exemplary Embodiments

Exemplary embodiments of the present invention are now described in detail. While these embodiments are primarily discussed in the context of cellular telecommunications networks, the general principles and advantages of the invention may be extended to other types of telecommunication networks, whether wireline or wireless, including for example wireless LAN (WLAN) or WMAN networks.

Exemplary Network Architecture—

FIG. 1a shows a functional block diagram of one exemplary embodiment of a network architecture 100 consistent with the present invention. The architecture includes a network communications medium 101, a user device 102, a network forwarding server 106, and a wireless base station 110. The forwarding server directs communications routing on the carrier network 112. The communication medium in this example is a cellular network (e.g., Long Term Evolution (LTE) and LTE-Advanced (LTE-A), Global System for Mobile Communications (GSM), General Packet Radio Service (GPRS), Enhanced Data Rates for GSM Evolution (EDGE), Universal Mobile Telecommunications System (UMTS), High Speed Packet Access (HSPA), Interim Standard 95 (IS-95), Code Division Multiple Access 1Xtreme (CDMA-1X), CDMA-2000, etc.), although it will be appreciated that other types of networks may be used consistent with the invention, including for instance the aforementioned WMANs and WLANs. Moreover, the invention contemplates hybrid network configurations, such as via circuit-switched PSTNs or the like communicating with packet-switched telephony networks via e.g., a gateway. For instance, a PSTN ("landline") user may call a first number of a mobile user, and be redirected or forwarded to another mobile number. Further, the following method and apparatus described hereinafter may be applied in wireline networks in which a device may have its number changed with relative frequency/ease (e.g. IP telephony).

As used herein, the terms "user device" or "mobile device" include, but are not limited to, any telephony-enabled device such as a cellular phone, smartphone, tablet computer, or the like.

Figure 1B:
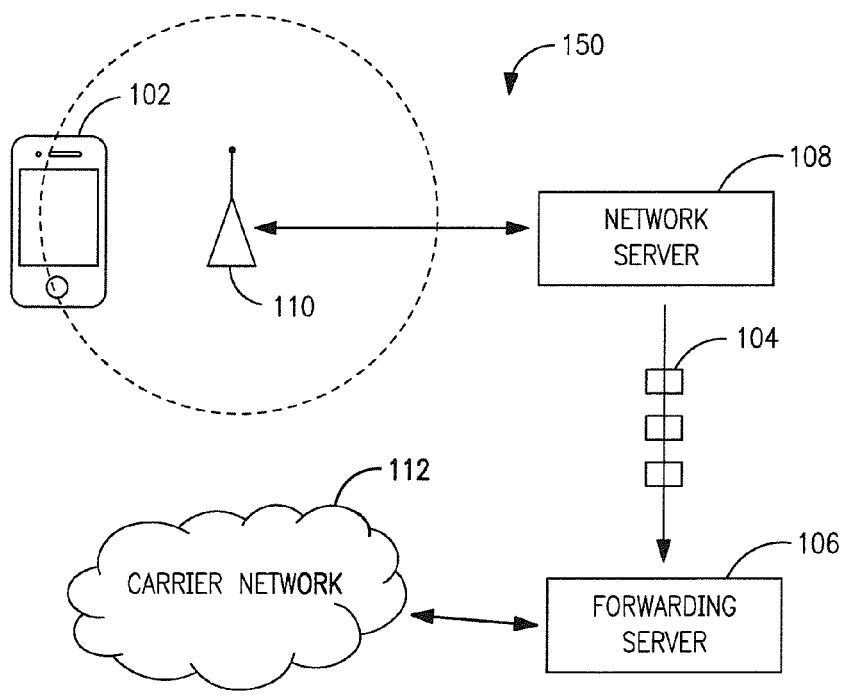
FIG. 1b is functional block diagram of a second exemplary embodiment of a network architecture consistent with the present invention, wherein a intermediary network server is utilized.

In operation of the architecture, of FIG. 1b, the user device 102 detects changes in its configuration (such as e.g., via swapping out of SIM cards), and then using one or more forwarding preferences, generates one or more forwarding instruction messages 104. The generated instruction messages 104 are then sent from the device 102 to a communications forwarding server 106 via data-traffic over the cellular network. The forwarding server directs communications in accordance with the forwarding messages on is associated carrier network 112.

A second exemplary embodiment of a network architecture is shown in FIG. 1b. In this second architecture 150, one or more of the actions involved in detecting the configuration change in the device 102, generating the forwarding instructions 104, and transmitting the forwarding instructions to the forwarding server 106 are performed by a network server 108. The network server 108 enables network side management of forwarding profiles and preferences. Thus, alleviating the need for the mobile device to store and manage these profiles and preference locally. For example, the network server may manage forwarding preferences for groups of associated numbers. Furthermore, in some such embodiments the network server facilitates transmission of forwarding messages 104 at the application layer of the mobile device (e.g. via SMS, IP, or other mobile data traffic, etc.). In light of this disclosure, it will be appreciated that in some variants some or all of the functions performed by the forwarding server 106 and the network server 108 may be performed by a single combined apparatus.

It will further be appreciated that while the foregoing architectures (and subsequently described methods) are primarily described in the context of physical form factor SIM or smart cards, the various aspects of the invention are equally applicable to non-physical or virtual SIM-like entities, such as for example the exemplary virtual access clients or "eSIMs" described in U.S. patent application Ser. No. 13/109,851 filed May 17, 2011 and entitled "METHODS AND APPARATUS FOR ACCESS CONTROL CLIENT ASSISTED ROAMING" which is incorporated herein by reference in its entirety. For example, in one such implementation, a user device (e.g., smartphone) is equipped with (or obtains) multiple electronic access clients for use on e.g., different wireless carriers, such as in different geographic regions. Upon switching access clients, the device (or network) detects the configuration change, and implements the forwarding policies as described infra.

Methods—

Figure 2:
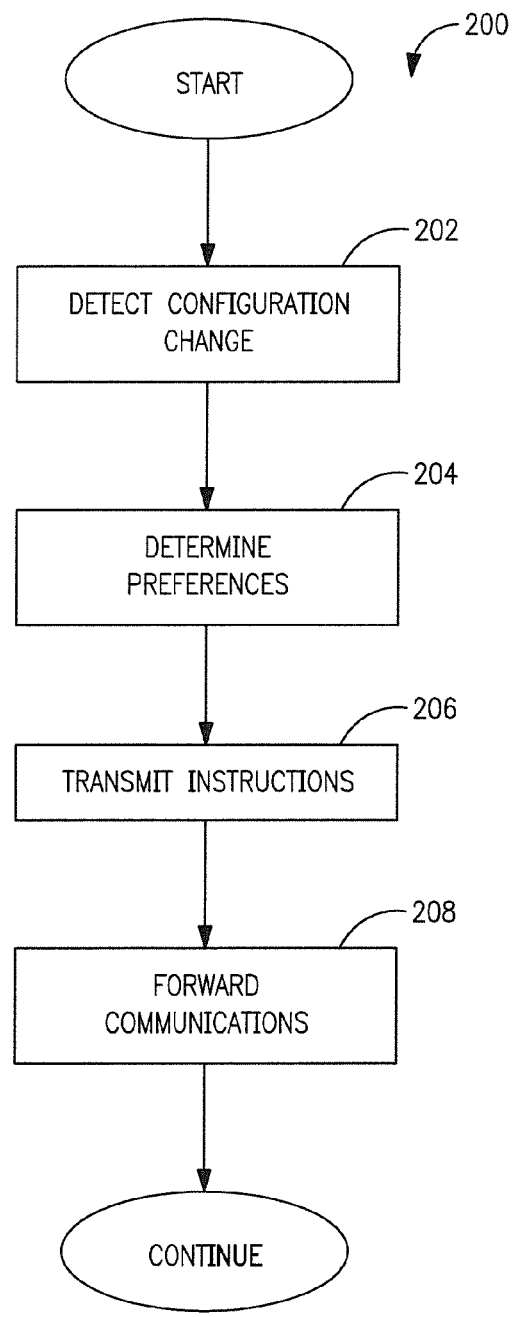
FIG. 2 is a logical flow diagram illustrating one embodiment of a generalized method for automated communications forwarding according to the invention.

FIG. 2 illustrates one embodiment of a generalized method 200 for automated communications forwarding according to the invention. At step 202, a change in configuration is detected or reported. In some embodiments, the configuration change is detected by the user device 102 itself. In some cases, this involves a determination by the device that a SIM card has been replaced with a new SIM card. The device may detect a new SIM card by logging a change in the serial number or other unique identifier of or associated with the active SIM card on the user device. Alternatively, the device may include a circuit to detect if a SIM card is physically removed from the device, such as via a loss of electrical continuity, activation of a switch, etc. Certain SIM cards may have internal toolkit applications that can initiate a phone number change. The activation of such a toolkit may also cause the device to log a configuration change. Further, the mobile device may enter a roaming area. Consistent with present invention, the device may treat entrance into such a roaming mode as a configuration change to avoid incurring excess charges on behalf the user. Then, the device 102 may perform a check for further configuration changes to confirm that profile configuration changes have occurred, or proceed with the method 200.

In other cases, the device 102 monitors specific configuration details. For example, the device may detect a configuration change in the phone number at which it is configured to receive communications; a new phone number is indicative of a new SIM card. Alternatively, the device may monitor the carrier to which it is connected, such as by reading a carrier ID on its active SIM card, a carrier identifier provide by the base station to which it is connected, or by querying a lookup service for IP devices, etc. If the carrier changes, the device registers a detected change.

In the case of an eSIM, the mobile device maintains (or accesses via a data connection) multiple SIM profiles that are not necessarily tied to a physical card disposed on the mobile device. The functional equivalent of a physical SIM card replacement occurs by the user designating a new eSIM for activation. Further, in some cases, the activation of an eSIM profile may occur without user intervention. For example, the mobile device may initiate a switch in eSIM profiles automatically (e.g. without a specific user request) upon entering a roaming area for a currently active eSIM profile. In the context of the present invention, when the user or the device 102 initiates an eSIM profile change the mobile device transmits a forwarding update message during the process of changing its active eSIM profile. In some variants, prior to performing the change in active eSIM profile, the mobile device maintains connectivity using the previous eSIM file long enough to transmit the forwarding update message 104. This message includes the number to which communications are to be forwarded. This number may include a stored value previously designated by the user, or this number may include the number associated with the new eSIM profile selected by the user or mobile device upon initiation of the profile switch.

Alternatively, in other variants, the forwarding message is transmitted after the eSIM profile change has been completed.

In some implementations, the user automatically change eSIM profiles on-the-fly using methods and architectures described in U.S. patent application Ser. No. 13/109,851 filed May 17, 2011 and entitled "METHODS AND APPARATUS FOR ACCESS CONTROL CLIENT ASSISTED ROAMING" previously incorporated herein by reference. As discussed therein, a mobile device may switch between multiple access clients (e.g., eSIMs) stored on a mobile device, where each eSIM contains a SIM configured to authenticate the mobile device with a carrier network. Specifically, in one exemplary embodiment, a mobile device detects a roaming condition, and responsively (or anticipatorily) evaluates its available eSIMs. If at least one eSIM is suitable for non-roaming operation with the current network, then the eSIM is loaded and the mobile device registers in its new home network.

In various embodiments, the eSIMs may be stored on remote modules accessed via data connection at the time of use based on processes and infrastructure discussed in U.S. patent application Ser. No. 13/093,722, filed Apr. 25, 2011 and entitled "APPARATUS AND METHODS FOR STORING ELECTRONIC ACCESS CLIENTS" being herein incorporated by reference in its entirety. As described therein, a eUICC appliance is implemented within a Hardware Security Module (HSM). Each HSM can store a large number of eSIMs to facilitate storage and distribution thereof, such as for retail services. The described electronic universal integrated circuit card (eUICC) appliances first verify that their peer eUICC appliances are operating according to an agreed upon and trusted protocol. If both eUICC appliances are in agreement, then, when the source eUICC appliance transfers its eSIM, it will delete its eSIM (or otherwise render its own eSIM inactive). The destination eUICC appliance will retain the only active eSIM.

In other embodiments, a network server 108 (FIG. 1*b*) detects the change in device 102 configuration (step 202). Some embodiments entail a server that logs the registration of a device at the phone number that had previously been inactive. This may occur, for example, when a user switches out a SIM card with a new one, and then powers on a mobile device. The device connects to the carrier for which the SIM card is configured, and registers itself at the number associated with the SIM card. For example, this may apply if the SIM card had been previously inactive (i.e. another SIM card was in the device, the device was powered down for an extended period, or the device lost connectivity for a prolonged period). Thus, a detection of a configuration change can be based on activation after a significant period of inactivity.

In some embodiments, deregistration of a previously active device 102 may also be used to detect a configuration change (e.g. if a user removes an active SIM card and the device no longer registers at the pervious phone number). Upon detection of a deregistration event, the server 108 looks up forwarding information for the deregistered number. In some variants, the server enforces a delay before setting up forwarding information to ensure that the deregistration was not due to an unintentional (or temporary) loss of service (dead zones, interference, or other service outage, or accidental or temporary removal of the SIM).

In yet other embodiments, the server 108 must detect both a registration and a deregistration before forwarding will be invoked. In these cases, the server does not update forwarding information unless a combination (and/or proper sequence) of events occurs. When the server determines that a number has been deregistered, the server waits to confirm that another number is activated in response. If these numbers correspond to a pair that are associated for forwarding purposes, the server logs a configuration change, and proceeds with the method 200. Conversely, if the server 108 determines that a previously inactive number has been registered, the server waits to confirm that a second number (forming the pair for forwarding) has been deregistered. In some variants, the server actively confirms that status of a second number. For example, if a number is registered (or deregistered), the server may send a query to determine the registration status of a number (or numbers) that corresponds to a pair for forwarding purposes.

In some embodiments the mobile device comprises a phone capable of multimode operation, and may have varying phone numbers associated with each of the multiple modes. For example the mobile device may be capable of operation on GSM, WCDMA, LTE, and CDMA networks and may switch between associated accounts/profiles to obtain optimal service. In this example, such service changes may register as configuration changes with either the mobile device or the server consistent with the present invention.

Following detection of a configuration change, the forwarding preferences are determined (step 204). In some embodiments, a list of preferences for communications forwarding is stored on the user device 102. In some cases, the user device references the list of preferences against the detected configuration change. For example, if the device 102 has detected a change (or impending change) in the phone number at which it is registered, the device determines if one (or both) of the numbers involved in the change have associated forwarding preferences. The device then compiles a sub-list of preferences pertaining to the details of the change for transmission to a forwarding server 106. In other variants, in response to a change in configuration, the device forwards its complete list of preferences to the forwarding server and any details the device has collected pertaining to the configuration change. In these variants, the forwarding server 106 determines the appropriate forwarding action based on the provided list and the details of the configuration change.

In other embodiments, the forwarding server 106 maintains the preference list. In one implementation, the forwarding server receives details regarding a configuration change from the device. The forwarding server 106 may receive a request from the device to enact (or alter) forwarding settings, but the device may not provide specific details along with the request. The forwarding server 106 then reviews the configuration change or forwarding request against the list of preferences.

In certain embodiments in which the network server 108 maintains the preference list, the server 108 also detects the configuration change. In these cases, the server may act without a prompt being transmitted from the device. Once the configuration change is detected by the server 108, the server references the details of the change versus the preferences list. This approach advantageously removes the user device from any processing or detection burden; i.e., the server 108 maintains the forwarding preferences, detects the change, evaluates the change, and implements any necessary forwarding policies seamlessly and with user device (or user) intervention.

The exemplary preferences list includes a list of numbers from which to forward communications to a given number under a given set of circumstances. These circumstances may include for instance requirements that a number be inactive before communications directed to that number are forwarded to a designated target. Similarly, the preferences may stipulate that a target forwarding number be active before communications are forwarded to it. Further, requirements may be enforced that e.g., only allow forwarding at specific times (e.g. certain hours of the day, or days of the week, etc) and/or under specific circumstances. A complimentary requirement may designate two numbers for which the forwarding relationship is automatically reversed at specific times, or depending on the location of the device. For example, communications may be automatically forwarded to a "work" number during business hours, and forwarded to a "personal" number at other times.

Preferences may also differ based on the source of the communication. For example, parents may often prefer to receive communications from their children even if they are currently at work, but the same individual may only want to receive work communications from important customers after business hours. Thus, consistent with one implementation of the present invention, preferences may also designate forwarding based on source.

In some embodiments, only sources explicitly designated for forwarding are forwarded. In these embodiments, a "white list" of sources (e.g. phone numbers, email addresses, instant messaging accounts, Skype® accounts) to forward is maintained in the preferences list; communications originating from other sources are directed to their initially designated targets.

In some variants, more detailed rules may be implemented. For example, some communications may be forwarded (or not forwarded) depending on the source and the active number or inactive number(s). For example, calls to a personal account from friends are not forwarded to a work account, but calls from the same friends are forwarded to the personal account if they were directed to a currently inactive work number.

It can also be appreciated in light of this disclosure, that a "black list" of numbers may be directed to inactive numbers or to a single number. Thus, in one particular implementation, a user is able to screen or review communications from such individuals without being directly accessible at any time.

Referring again to FIG. 2, at step 206, a message or other signaling detailing the forwarding instructions 104 is transmitted from the network server 108 to a forwarding server 106. The forwarding instructions 104 include at least enough detail to ensure that the forwarding server behaves in accordance with the forwarding preferences. It will be appreciated that the message(s) need not necessarily themselves carry an "instructions" per se; for instance, in one variant, the instructions merely include an identifier or other data identifying a set of stored forwarding rules or policies resident at the server (or another entity accessible to the server). This can even be keyed off an extant identifier of the phone or user (e.g., by knowing the identity of the phone or the user to which it is registered, the server can merely receive a "flag" or other indicator from the phone that a change has occurred for that phone/user, and implement the pre-stored policies accordingly).

The forwarding server then directs communications according to the instructions (or identifier/flag). In some cases, multiple messages 104 to one or more forwarding servers 106 may be transmitted. This is often the case when the forwarding preferences for more than one number must be updated, or when the different updated numbers are administered by more than one carrier. These multiple forwarding servers 106 may be within the same carrier's network, or alternatively in different networks. In the latter case, as described in greater detail subsequently herein, the forwarding message 104 can be sent via a ubiquitous or common transport modality to each of the disparate carriers, such as e.g., via TCP/IP transport.

In some embodiments, the user device 102 itself transmits the forwarding message 104 to the forwarding server 106. In a number of these embodiments, the device sends these messages at base levels of the network protocol stack, such as messages sent to the forwarding server 106 from processes running on a baseband processor of the mobile device. For example, 3GPP and 3GPP2 have defined messages that may be sent for the purposes of updating forwarding information on call routing servers. In this process, the baseband processor of the mobile device detects an impending configuration change (e.g. a SIM card has been removed or replaced, or a new eSIM profile has been selected, etc.). In the process of executing the profile change, the baseband processor transmits a forwarding message to the forwarding server. Thus, in these embodiments the forwarding updates are initiated below the application layer of the mobile device.

In some such embodiments, the forwarding message 104 is sent before the device updates its connectivity configuration. In some systems, a device may not be able to transmit a forwarding message once it has connected to a new carrier. In these eases, the old profile active on the mobile device is maintained for sometime after the profile change process has be initiated. To accomplish this, the old profile persists in the mobile device memory long enough to facilitate transfer of the forwarding message (including situations in which the physical SIM card is removed). For example, mobile devices may be configured to perform book keeping operations after a SIM card is removed. Forwarding messages may be transmitted during this period. Once the forwarding message is transferred, the mobile device ceases the old profile memory persistence and proceeds with the profile change. Such embodiments may be implemented, inter alia, on mobile devices that support "hot-swapping" of SIM, eSIM profiles, or SIM card with internal toolkit applications (i.e. capable of altering an active profile without a power-off or reset). Similarly if the configuration change comprises an automated service switch (e.g. as discussed above among GSM, WCDMA, LTE, or CDMA) or a switch upon entering a roaming area, the phone may complete the forward update before the switch is complete given that the device has proper notice of the impending change. In some variants, upon initiation of a power-off or reset event, a provisional forwarding message may be sent prior to execution of the power-off or reset (this message may include a default or user specified forwarding number). This process may be used to ensure that proper forwarding occurs even if the profile change is initiated while the phone is powered off or in the process of a reset. The provisional forwarding message may be cancelled or overridden with a second message (once the mobile re-establishes its connection) if a configuration change did not occur during the power-off or reset event.

In other systems, forwarding updates may be handled through any carrier (e.g. forwarding handled at an IP layer, and/or different carriers support forwarding update message routing amongst themselves), and the forwarding updates may be handled either before or after the device enacts the configuration change. In yet other implementations, forwarding messages must be transmitted both before and after the configuration changes occur. In these systems, the settings related to both the previously active number and newly active number are updated. When the forwarding servers 106 managing the different profiles have no means of synchronizing between each other, the device must provide updates to both;

otherwise, such synchronization mechanisms can be used (if present) to obviate at least some of the otherwise necessary multiple updates.

In others embodiments in which the device 102 transmits the forwarding message, the forwarding is handled by higher level (e.g. application layer) processes. In these embodiments, the forwarding messages may use a variety of transmission means. For example, the forwarding messages 104 may be sent over data connections (e.g. IP transports) or through SMS text messaging. Thus, such forwarding management applications running in the application layer may advantageously be widely compatible with different hardware and networks. These widely compatible transmissions allow the device to send forwarding messages from virtually any carrier network to any other.

As discussed previously with respect to FIG. 1b, the transmission of the forwarding instruction message is handled in certain implementations by a network server 108. The network server transmits the forwarding message to the forwarding server 106 over any of various interfaces available to the server 108. In the case of a combined forwarding server 106 and network server 108, the combined apparatus may involve a server running applications or processes that perform the functions of both the receiving and forwarding servers.

At step 208 of the method 200, the forwarding server updates the forwarding settings for the profile(s), and communications (voice, SMS, MMS, etc) are subsequently forwarded accordingly.

Exemplary User Device—

Figure 3:
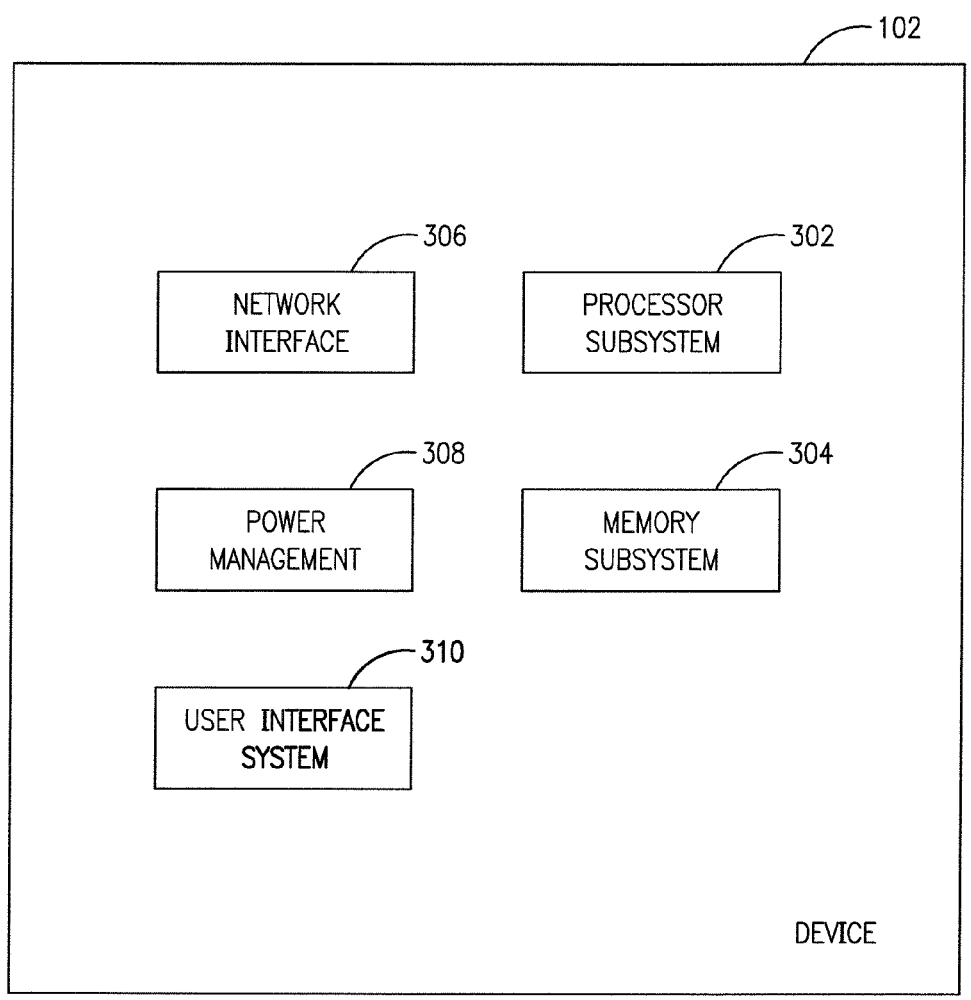
FIG. 3 is a functional block diagram illustrating one embodiment of a device configured to initiate automated communications forwarding, in accordance with the present invention.

Referring now to FIG. 3, an exemplary embodiment of a user device 102 configured to implement the methods of the present invention is illustrated.

The user device 102 includes a processor subsystem 302 such as a digital signal processor, microprocessor, field-programmable gate array, or plurality of processing components mounted on one or more substrates. The processing subsystem may also include an internal cache memory. The processing subsystem 302 is connected to a memory subsystem 304 including memory which may for example, include SRAM, flash and SDRAM components. The memory subsystem may also include one or more smart card (i.e. SIM, USIM, etc.) bays, and/or be configured to store one or more virtual access clients (e.g., eSIM profiles) of the type previously described. The memory subsystem may implement one or a more of DMA type hardware, so as to facilitate data accesses as is well known in the art. The processor is configured to, inter alia, execute computer-readable instructions that are stored within the memory subsystem.

In one exemplary embodiment, the memory subsystem 304 includes a set of forwarding preferences, where the forwarding preferences detail the forwarding behaviors/policies to be enforced for the different profiles of the device 102.

Moreover, the processor subsystem may further include a rules engine (e.g., logic or software process), where the rules engine is configured to detect when a configuration change has occurred within the device (based on monitoring one or more settings, or alternatively, based on the detection of a smart card (or eSIM profile) change), and select an appropriate one of multiple rules or policies based on e.g., user- or network-supplied preferences, or yet other considerations. For example, in one variant, the rules engine is configured to determine one or more relevant parameters (e.g., time of day, user device location (such as via a GPS receiver), user "context" (e.g., at work, at home, traveling, etc.)) and based on logic in the rules engine algorithms, select one or more appropriate forwarding policies for inclusion in the message(s) sent to the server(s) 106, 108. Alternatively, various other alternative configurations may be used, such as where: (i) the rules engine resident on the user device 102 identifies an appropriate policy or rule set, and forwards its decision/recommendation to a network entity (e.g., server 106, 108); or (ii) the rules engine is resident on the network entity, and the user device forwards any constituent information necessary (e.g., GPS coordinates, user-supplied use context, etc.) to the network entity so as to permit the rules engine to select the appropriate policy or rule set.

The rules engine (where used) may also be configured to evaluate or decide based at least partly on network operational or business considerations such as e.g., available resources, profitability, user subscription level, etc. For instance, in one such variant, the user's subscription level is consulted to determine what forwarding options/features are available to them; ostensibly, a higher or more fully-featured subscription will provide the user with additional options or capabilities not present at the lower levels, such as e.g., "stealth mode" or Caller ID for incoming calls to be forwarded.

In addition, the processor subsystem 302 of the apparatus 300 of FIG. 3 may further run a management application to receive updated preference information for communications forwarding from the user of the device. If the preferences are maintained on the device 102, the updates are added to the preferences stored in the memory subsystem 304. Otherwise, the updates are transmitted to the network server 108 that maintains the communications forwarding preference list.

In some embodiments, the network interface 306 may include a radio modem. The radio modem generally includes a digital baseband, analog baseband, TX frontend and RX frontend. The user device 102 further includes an antenna assembly that includes a plurality of switches for enabling various antenna operational modes, such as for specific frequency ranges, or specified time slots. In certain embodiments, some components may be obviated or may otherwise be merged with one another as would be appreciated by one of ordinary skill in the art given the present disclosure. In one exemplary embodiment, the radio/modem subsystem is configured to, inter alia, transmit and receive radio frequency (RF) in compliance with multiple cellular standards (i.e. GSM, CDMA, WCDMA, LTE). The radio modem may be configured to switch between these services for optimal service, and transmit corresponding communications update messages. In various other embodiments, the mobile device may support these or other common cellular network standards previously referenced herein.

The illustrated power management subsystem (PMS) 308 provides power to the apparatus, and may include an integrated circuit and or a plurality of discrete electrical components. In one exemplary portable mobile device implementation of the apparatus, the power management subsystem 308 interfaces with a battery.

In certain embodiments of the user device 102, a user interface system 310 may be provided. A user interface may include any number of well-known I/O including, without limitation: a keypad, touch screen or "multi-touch" screen, LCD display, backlight, speaker, and microphone. However, it is recognized that in certain applications, one or more of these components may be obviated. For example, PCMCIA card type mobile device embodiments may lack a user interface (as they could piggyback onto the user interface of the device to which they are physically and/or electrically coupled).

The apparatus 102 may further include optional additional peripherals including, without limitation, one or more GPS transceivers, or network interfaces such as IrDA ports, Bluetooth transceivers, Wi-Fi (IEEE Std. 802.11) transceivers, WiMAX (IEEE Std. 802.16e) transceivers, USB (e.g., USB 2.0, USB 3.0, Wireless USB, etc.), Fire Wire, Thunderbolt, etc. It is however recognized that these components or interfaces are not necessary for operation of the user device 102 in accordance with the principles of the present invention.

Exemplary Network Server—

Figure 4:
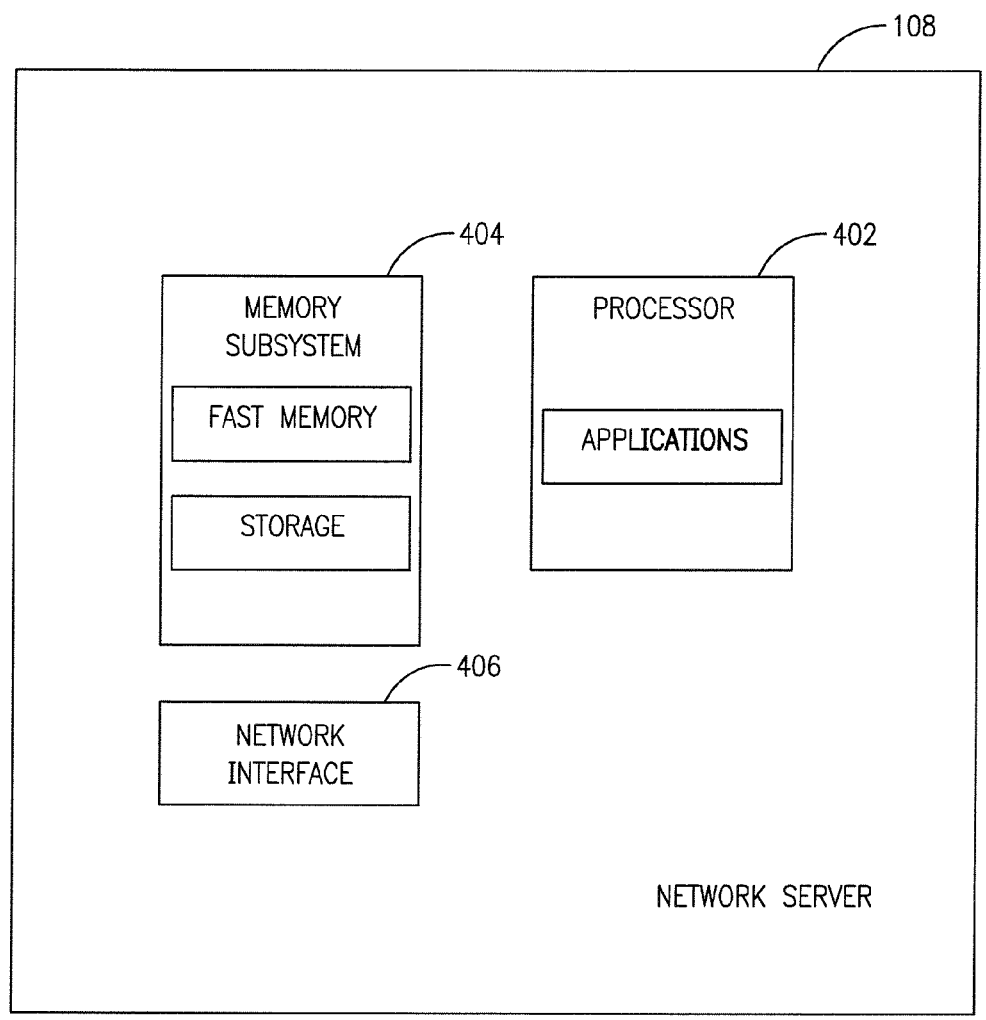
FIG. 4 is a functional block diagram illustrating one embodiment of a network server configured to initiate automated communications forwarding, in accordance with the present invention.

Referring now to FIG. 4, an exemplary embodiment of a network server (such as e.g., the network server 108 of FIG. 1b discussed supra) for implementing the methods of the present invention is illustrated and described.

The network server includes a processor 402 running applications thereon. The processor may include various processing elements (e.g. digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs), etc.). The processor is in data communication with a memory subsystem 404 and a network interface 406. The network interface 406 may include any number of configurations or functionalities (e.g. Firewire, USB, Ethernet, 10-Gig-E, Thunderbolt, Serial ATA, Ultra-ATA/DMA) or optical interfaces, etc.). The memory subsystem 404 includes multiple memory modalities to support fast memory applications (e.g. DRAM, SDRAM, DDR/2 SDRAM, EDO/FPMS, RLDRAM, SRAM) and storage applications (e.g. computer hard drives, DVR device, memory, RAID devices or arrays, optical media, etc.).

The network server is in data communication, via the abovementioned network interfaces, with one or more wireless base stations 110 capable of maintaining connectivity to wireless mobile devices on a cellular network (e.g. LTE LTE-A, GSM, GPRS, EDGE, UMTS, HSPA, IS-95, CDMA-1X, CDMA-2000, etc.). These base stations transmit forwarding update messages and other cellular traffic between the mobile devices and the other elements of the carrier network (including, for example, the network server 108 and/or the forwarding server 106).

The processor 402 may run one or more applications that monitor, via the network interface 406, the status of various profiles for devices connected to the network (e.g. device registration activity on a phone number). Thus, the network server 108 is capable of detecting event requiring an update in forwarding behaviors.

Upon detection of a configuration change, monitoring applications (in the exemplary network-based configuration of FIG. 1b) refer to the preferences stored within the memory subsystem 404 (or otherwise obtained from another network device, or even the user device itself), and determine if the preferences dictate a change in forwarding settings based on the details of the configuration change. If so, the network server compiles and transmits forwarding instruction message(s) 104 for the forwarding server 106.

Example Operation 1

One exemplary method for the automated forwarding of communications consistent with the present invention is applied in the context of a mobile device connecting to multiple wireless carriers using multiple profiles.

In this exemplary embodiment, a mobile user maintains a "work" profile on Carrier A, and a "personal" profile on Carrier B. The user switches between the profiles (and carriers) by switching between SIM card A or eSIM (for Carrier A) and SIM card B or eSIM (for Carrier B) on a single mobile device. Each of the profiles has an associated phone number (numbers A and B, respectively). The mobile device only connects to one carrier at any given time.

Figure 5:
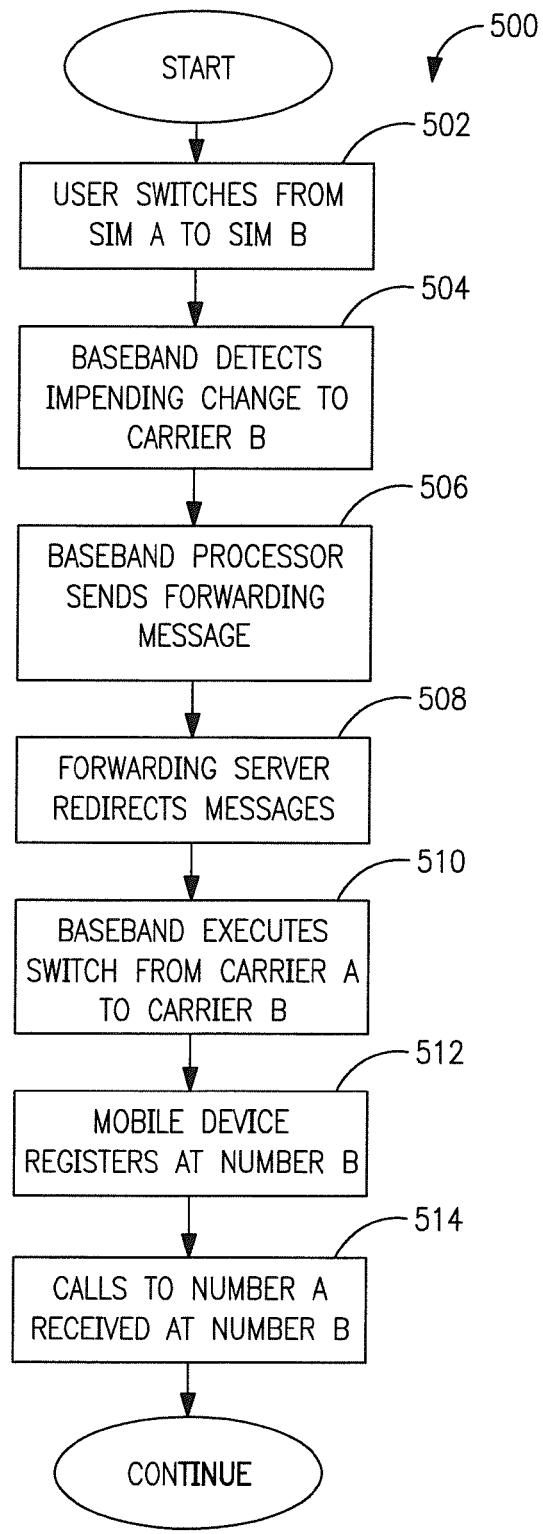
FIG. 5 is a logical flow diagram illustrating an exemplary call forwarding update process according to one embodiment of the invention, in the context of a user device having access to two (2) different carriers.

Referring now to FIG. 5, a logical flow diagram of an exemplary embodiment of the process 500 of automated call forwarding updating in response to a profile change is shown. When the user switches from SIM card A to SIM card B (step 502), the baseband processor in the mobile device detects the impending change (step 504). At step 506, the mobile device first sends a call forwarding update message to a server in control of call routing on Carrier A. The call forwarding update message instructs the server to forward all calls for number A to number B on Carrier B (step 508). Then at step 510, the mobile device disconnects from Carrier A, updates its own settings for compatibility with Carrier, connects to Carrier B, and registers at phone number B (step 512). The forwarding server of Carrier A the calls it receives for phone A to phone number B (step 514).

Similarly, when switching from SIM card B to SIM card A, the processes is reversed for Carriers B and A.

Thus, consistent with the present invention, the user may be reached on either of the two numbers regardless of which account is currently active on the mobile device.

Example Operation 2

In a second exemplary operational scenario, call forwarding updates are managed by the network rather than the mobile device. A user maintains one or more call forwarding preferences as a part of a profile (or multiple profiles associated with the same user or device) on a call management server. The call forwarding preferences include in one implementation a list of numbers that are designated for call forwarding. In this case, the call management server sends messages to other call management servers indicating that some or all calls to the numbers on the list should be forwarded to a currently active number when the calls are initially directed to an inactive number. Thus, the user may maintain any number of phone numbers for which only one is active at any given time.

In this case, the user limits the calls that are forwarded by specifying rules for forwarding. The call forwarding preferences in this example identify a first group of phone numbers associated with work. Calls from these numbers are never forwarded. The call management server directs these numbers to voicemail if the user's currently active number does not match the number dialed. The call forwarding preferences also identify a second group of phone numbers associated with e.g., friends. Calls from these numbers are forwarded unless the active number is designated as the user's work number. A family group is also identified by the call forwarding preferences; calls from this group are always forwarded to the active number regardless of which number on the forwarding list was initially dialed.

Thus, consistent with the present invention, the network (or more specifically a network server) may handle call forwarding preferences. Further, the user may increase his/her ability to be reached without necessarily extending this increased availability to all parties attempting to contact the user.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A mobile device for use in one or more telecommunications networks, the mobile device comprising:
   a storage entity configured to store a network profile associated with the mobile device, wherein the storage entity is further configured to store a list of preferences that comprise one or more communications forwarding rules for a group of numbers;
   a wireless interface; and
   a processing entity in data communication with the storage entity and the wireless interface, the processing entity comprising a plurality of instructions configured to, when executed, cause the mobile device to:
      detect a change in an operational status of the mobile device, wherein detecting the change comprises detecting a physical removal of a SIM card from the mobile device and a replacement of the removed SIM card with a replacement SIM card in which the network profile associated with the mobile device is stored, and
      in response to the detection:
         send a message to a forwarding server, the message configured to cause the forwarding server to forward communications addressed to a first number associated with the removed SIM card to a second number associated with the network profile, based at least on the list of preferences, wherein the one or more communications forwarding rules include a list of sources from which communications addressed to the first number are to be forwarded to the second number.

2. The mobile device of claim 1, wherein the communications forwarding rules require the first number to be inactive before the message is sent.

3. The mobile device of claim 1, wherein the communications forwarding rules require the second number to be active before the message is sent.

4. The mobile device of claim 1, wherein communications addressed to the first number that originate from sources not included on the list of sources are not forwarded to the second number.

5. The mobile device of claim 1, wherein:
   the storage entity is further configured to store one or more electronic subscriber identity modules (eSIMs); and
   the detection of the change in the operational status of the mobile device further comprises an activation of one or more of the eSIMs.

6. The mobile device of claim 1, wherein the message comprises data sent over an Internet Protocol (IP) connection.

7. The mobile device of claim 1, wherein the mobile device comprises a cellular device compliant with one or more of a Long Term Evolution (LTE) or Long Term Evolution-Advanced (LTE-A) standard.

8. The mobile device of claim 1, wherein the change in operational status further comprises a change in a carrier.

9. A method of managing communications forwarding in a telecommunications network, the method comprising:
   receiving an indication of a network configuration change for a wireless device, the indication of the network configuration change comprising a list of preferences, wherein the list of preferences comprises one or more communications forwarding rules for a group of numbers, the one or more communications forwarding rules including a list of sources from which communications addressed to a first number are to be forwarded to a second number;
   determining an appropriate forwarding action, the forwarding action comprising changing a phone number of the wireless device from the first number to the second number, the determining based at least in part on the list of preferences; and
   based at least in part on the determination, transmitting forwarding instructions to a server entity of the telecommunications network, the forwarding instructions causing one or more communications directed to the first number to be redirected to the second number.

10. The method of claim 9, wherein the receiving comprises receiving an indication that a registration of a smart card associated with the second number has occurred.

11. The method of claim 9, wherein the list of preferences further comprises: (i) a first list of sources from which communications are forwarded when addressed to either of the first or second numbers, and (ii) a second list of sources from which communications are only forwarded when addressed to the first number.

12. The method of claim 9, wherein the forwarding instructions comprise data sent over an Internet Protocol (IP) connection.

13. A network server apparatus for use in direction of communications signals among a plurality of mobile devices; the network server apparatus comprising:
   a network interface configured to receive at least indications of status changes from the plurality of mobile devices, wherein the indications of status changes comprise detection of a physical removal of a SIM card from at least one of the plurality of mobile devices and a replacement of the removed SIM card with a replacement SIM card in which a network profile is stored;
   a storage device configured to store a plurality of user preferences, wherein the plurality of user preferences comprises one or more call forwarding rules including a list of numbers for which communication signals addressed to those numbers are caused to be forwarded to an active number associated with one of the plurality of mobile devices; and
   a processing device configured to run at least one computer program thereon, the at least one computer program comprising a plurality of instructions configured to, when executed, cause the network server apparatus to:
      determine whether one or more of the indications of status changes comprise a request to change the active number associated with the one of the plurality of mobile devices, and
      in response to the determination, cause communication signals to be forwarded to the active number associated with the one of the plurality of mobile devices.

14. The network server apparatus of claim 13, wherein the indications of status changes further comprise a registration of the one of the plurality of mobile devices associated with the active number.

15. The network server apparatus of claim 13, wherein the communications signals are caused to be forwarded by the network server apparatus transmitting a forwarding message to a forwarding server.

16. The mobile device of claim 1, wherein detecting the physical removal of the SIM card comprises detecting a loss of electrical continuity.

17. The mobile device of claim 1, wherein detecting the change in operational status further comprises detecting entrance of the mobile device into a roaming mode.

* * * * *